United States Patent
Teramoto

(10) Patent No.: US 6,429,862 B1
(45) Date of Patent: Aug. 6, 2002

(54) THREE-DIMENSIONAL IMAGE PROCESSING APPARATUS

(75) Inventor: Fuyuhiko Teramoto, Kashiwa (JP)

(73) Assignee: Hitachi Medical Corporation, Tokyo (JP)

( * ) Notice: Subject to any disclaimer, the term of this patent is extended or adjusted under 35 U.S.C. 154(b) by 0 days.

(21) Appl. No.: 09/418,992

(22) Filed: Oct. 14, 1999

(30) Foreign Application Priority Data

Oct. 16, 1998 (JP) .......................................... 10-295804

(51) Int. Cl.[7] .............................................. G06T 15/00
(52) U.S. Cl. ...................................................... 345/419
(58) Field of Search ................................. 345/419, 420, 345/421, 649, 650, 653, 654; 378/15, 20, 4

(56) References Cited

U.S. PATENT DOCUMENTS

| | | | |
|---|---|---|---|
| 4,789,929 A | 12/1988 | Nishimura et al. | .... 364/413.15 |
| 6,317,619 B1 * | 11/2001 | Boernert et al. | ............ 600/410 |
| 6,329,963 B1 * | 12/2001 | Chiabrera et al. | .......... 345/653 |
| 6,332,035 B1 * | 12/2001 | Basu et al. | ..................... 378/4 |
| 6,351,273 B1 * | 2/2002 | Lemelson et al. | .......... 345/786 |

* cited by examiner

Primary Examiner—Phu K. Nguyen
(74) Attorney, Agent, or Firm—Oliff & Berridge, PLC

(57) ABSTRACT

A three-dimensional image processing apparatus, which forms three-dimensional image data by combining a plurality of two-dimensional data and displays the formed three-dimensional images, makes it possible to continuously output the three-dimensional images at a plurality of measurement positions. An image processing unit composes data in order to produce the three-dimensional image data. In the composition, the latest three-dimensional image data is recursively produced by combining the second latest three-dimensional image data and the latest two-dimensional image data. Every time the two-dimensional image data is acquired at each measurement position, the image processing unit produces three-dimensional image data from a measurement starting position up to the latest measurement position and displays the three-dimensional image. This enables the real-time display of the three-dimensional image data during the measurement before the acquisition of the two-dimensional image data at all the measurement positions is completed.

8 Claims, 9 Drawing Sheets

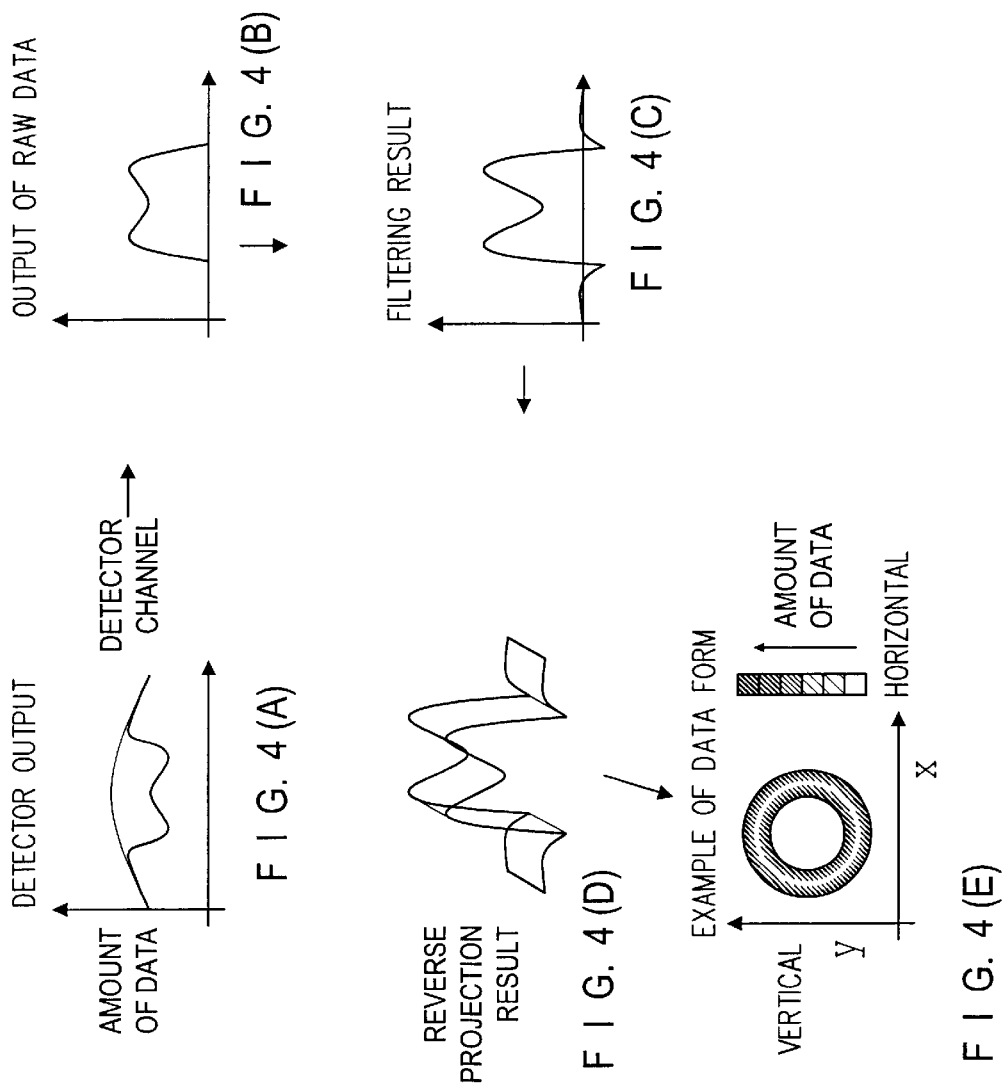

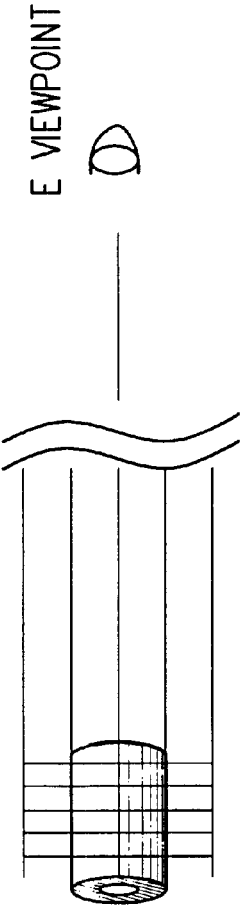

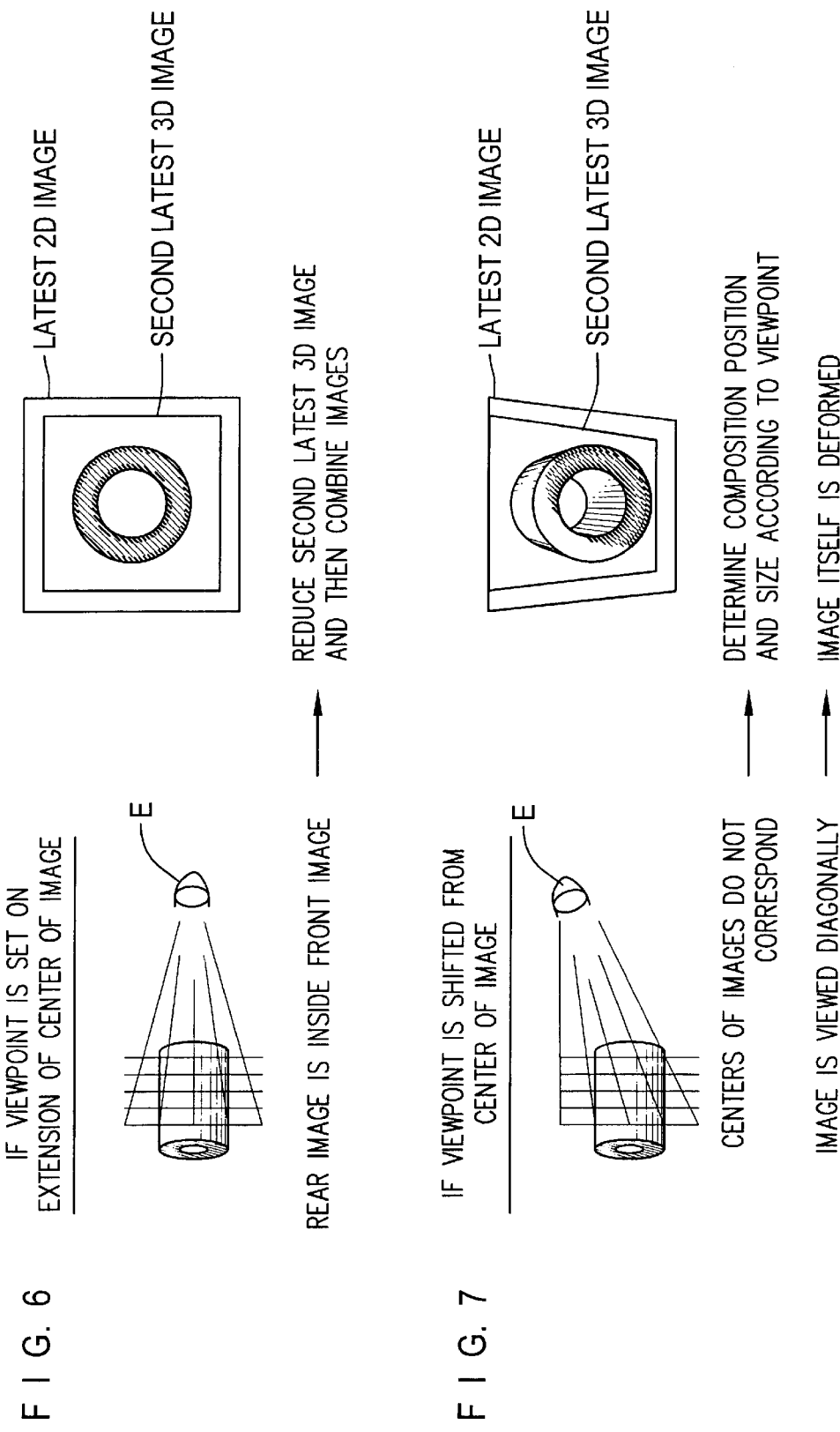

EXAMPLE OF FUNCTION OF
CT VALUE AND TRANSPARENCY
F I G. 9 (A)
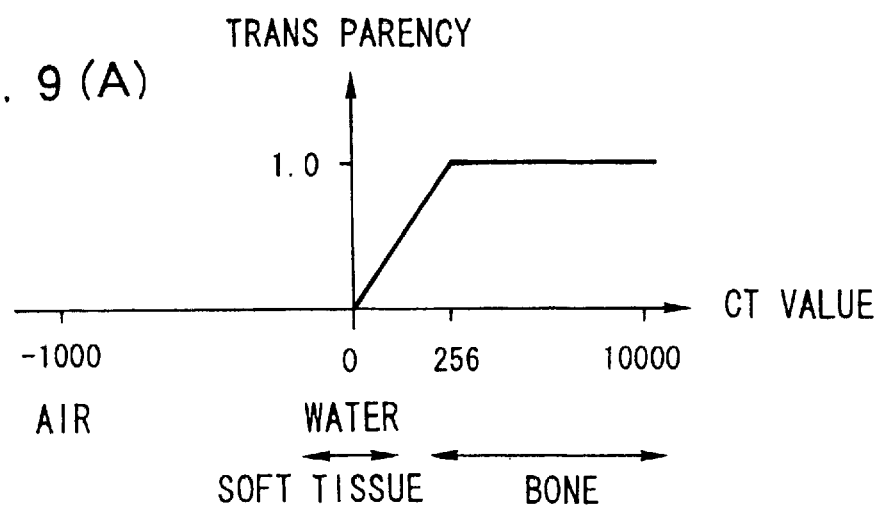
F I G. 9 (B)
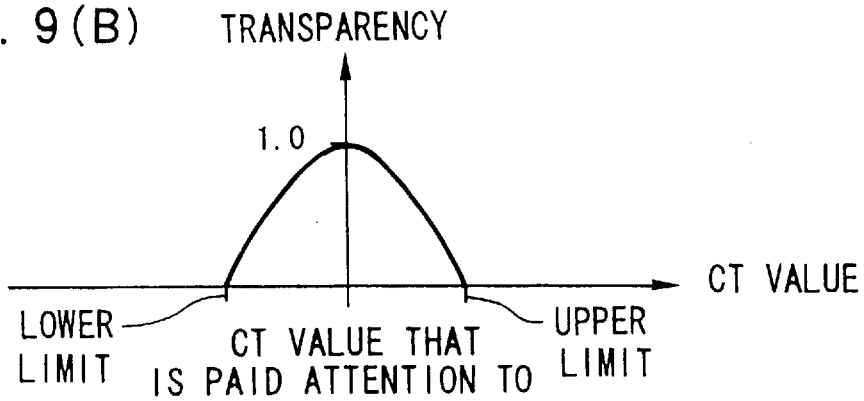
F I G. 9 (C)
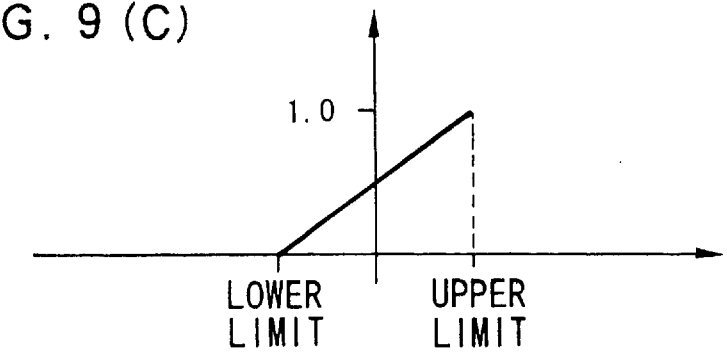

FIG. 10
PRIOR ART
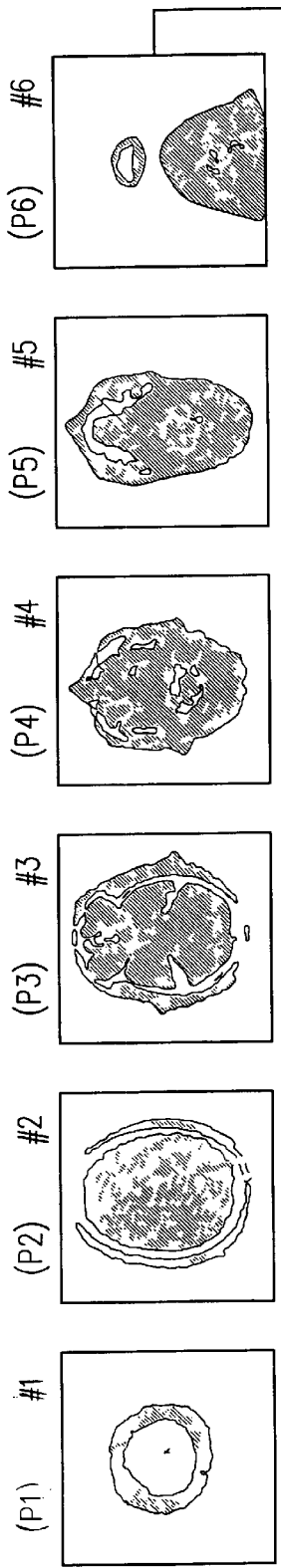
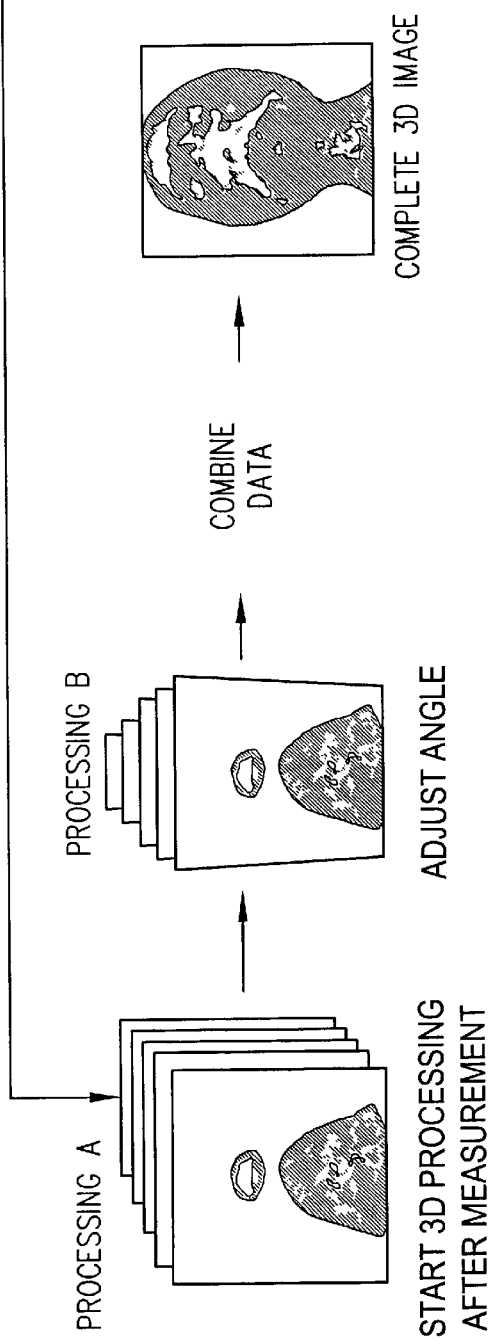

THREE-DIMENSIONAL IMAGE PROCESSING APPARATUS

BACKGROUND OF THE INVENTION

1. Field of the Invention

The present invention relates generally to a three-dimensional image processing apparatus, and more particularly to a three-dimensional image processing apparatus that forms a three-dimensional image by combining a plurality of two-dimensional tomographic images.

2. Description of Related Art

A tomographic image acquired by an X-ray computed tomography (CT) system consists of two-dimensional data composed of a matrix of lateral and longitudinal pixels. The number of each of lateral and longitudinal pixels is, for example, 512. The lateral direction of the tomographic image corresponds to the lateral direction of a subject (e.g., a human body), and the longitudinal direction of the tomographic image corresponds to the sagittal direction of the subject. A plurality of tomographic images is acquired by gradually shifting the measurement positions along the axis of the subject to thereby produce three-dimensional image data on the lateral direction, the sagittal direction and the axial direction of the subject. A conventional method for forming a three-dimensional image from the three-dimensional data comprises the steps of:

(i) acquiring two-dimensional data a plurality of times;

(ii) producing three-dimensional data from the two-dimensional data acquired at the step (i) and writing the three-dimensional data in a memory;

(iii) setting a viewpoint and rotating the three-dimensional data produced at the step (ii) according to the viewpoint; and (iv) combining the data to compute three-dimensional pixel values.

If the two-dimensional data (reconstructed data) acquired by one measurement at the step (i) is $d(x, y)$, the three-dimensional data produced at the step (ii) is $d(x, y, z)$. The coordinates of pixels are transformed at the step (iii) as follows:

$$(x, y, z) \rightarrow (x', y', z'), \tag{1}$$

where $z'$ is a coordinate on the $z'$ axis, which is set along the sagittal direction from a viewpoint (e.g., at the front), and is the distance between the viewpoint and the pixel. In this case, only the coordinates are transformed, and the pixel values are unchanged. The three-dimensional data $d(x', y', z')$ is produced by the coordinate transformation. At the step (iv), the data are combined as expressed by the following equation to thereby compute a pixel value $d_z$:

$$d_z(x', y') = F\{d(x', y', z_1'), d(x', y', z_2'), \ldots, d(x', y', z_m')\}; \tag{2}$$

where F is a combining function, and factors thereof are all the coordinate values $Z' = z_1', z_2', \ldots, z_m'$ where pixels of the $z'$-axis exist with respect to the coordinate $(x', y')$. If there is no pixel at a point $(x', y')$, the data is not combined for the point $(x', y')$ in accordance with the equation (2), and it is determined that there is no pixel. If the pixel exists at only one point $(x', y', z_1')$ a pixel value at this point $(x', y', z_1')$ is selected as $d_z(x', y')$. In short, the data are combined according to the equation (2) only when the pixels exist at two or more points. For example, if the depth projection method is used, the combining function F selects only a pixel value at the coordinate value $z_1'$ of the $z'$-coordinate that is closest to the viewpoint among the coordinate values $z' = z_1', z_2', \ldots, z_m'$. The combining function F processes the data so that the closer (smaller) the coordinate value $z'$ is, the larger the pixel value $d_z$ is and that the farther (larger) the coordinate value $z'$ is, the smaller the pixel value $d_z$ is. For example, the combining function F is represented as:

$$d_z = D/z'; \tag{3}$$

or $$d_z = D \cdot (1-z') \tag{4}$$

where $z'$ is the $z'$-coordinate of the closest pixel, and D is the set pixel value when $z'=0$. $d_z(x', y')$ is found for every coordinate $(x', y')$ to produce three-dimensional data. The three-dimensional data are displayed on a two-dimensional screen to thereby complete a three-dimensional image.

FIG. 10 shows the conventional procedure for forming a three-dimensional image. In the conventional measurement, two-dimensional images (#1–#6) are outputted every time the measurement positions are updated like $P_1$ (the starting position)$\rightarrow P_2 \rightarrow \ldots \rightarrow P_6$. After all the images (#1–#6) are reconstructed as a result of the measurements, the three-dimensional image forming processing is started, and the images (#1–#6), which are recorded in the measurements, are read out (the processing A), and they are rotated according to the viewpoint (the processing B). Then, the data are combined in accordance with the combining function to thereby complete a three-dimensional image.

In the conventional procedure, however, the three-dimensional image is ordinarily formed after the acquisition of the two-dimensional data and the reconstruction of the two-dimensional images are completed. Thus, the conventional procedure cannot satisfy the need for outputting a three-dimensional image in real-time during the acquisition of the two-dimensional data (for example, when the acquisition of the data relating to the image #3 is finished in the case that the images #1–#6 are used to form the complete three-dimensional image). Since all the two-dimensional images are used to form the three-dimensional image after the reconstruction of the two-dimensional images, the waiting time until the completion of the three-dimensional image is so long that the efficiency of the imaging diagnosis is decreased.

SUMMARY OF THE INVENTION

In view of the forgoing, it is an object of the present invention to provide a three-dimensional image processing apparatus that enables a high-speed processing by producing three-dimensional images in real-time during the acquisition of two-dimensional data.

To achieve the above-mentioned object, the present invention is directed to a three-dimensional image processing apparatus, comprising: a measurement position setting device which sets a plurality of measurement positions in a predetermined order in a predetermined direction of a subject; a measurement data collecting device which collects measurement data of the subject at the plurality of measurement positions; a two-dimensional image data acquiring device which acquires two-dimensional image data from the measurement data at the plurality of measurement positions in the predetermined order; a three-dimensional image data producing device which produces, every time the two-dimensional image data acquiring device acquires latest two-dimensional image data, three-dimensional image data on the basis of the latest two-dimensional image data and two-dimensional image data acquired before the latest two-dimensional image data; and a display which displays the three-dimensional image data as a three-dimensional image every time the three-dimensional image data producing device produces the three-dimensional image data.

To achieve the above-mentioned object, the present invention is also directed to a three-dimensional image processing apparatus, comprising: a measurement position setting device which sets a plurality of measurement positions in a predetermined order in a predetermined direction of a subject; a measurement data collecting device which collects measurement data of the subject at the plurality of measurement positions; a two-dimensional image data acquiring device which acquires two-dimensional image data from the measurement data at the plurality of measurement positions; and a three-dimensional image data producing device which produces three-dimensional image data on the basis of the two-dimensional image data at the plurality of measurement positions, the three-dimensional image data producing device producing three-dimensional image data in a measurement area corresponding to the plurality of measurement positions set by the measurement position setting device by combining three-dimensional image data produced on the basis of two-dimensional image data at a measurement position that is set before the finally set measurement position among the plurality of measurement positions and two-dimensional image data at the finally-set measurement position while the measurement data collecting device is measuring the measurement data.

According to the present invention, the plurality of measurement positions is set in the predetermined direction of the subject in the predetermined order, and the two-dimensional image data acquiring device acquires the two-dimensional image data at the plurality of measurement positions. The three-dimensional image data producing device produces the three-dimensional image data at the finally-set measurement position by combining the three-dimensional image data at the measurement position that is set at the predetermined distance from the finally-set measurement position, with the two-dimensional image data at the finally-set measurement position.

Preferably, the apparatus further comprises a display which displays the three-dimensional image data, produced by the three-dimensional image data producing device, as a three-dimensional image. This enables the real-time display of the three-dimensional image data on the display during the acquisition of the two-dimensional image data.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 4(A)–4(E) are explanation drawings showing image production data before the composition in the three-dimensional image production processing;

FIG. 5 is an explanation drawing showing the positioning for combining images in the case where a viewpoint is set at an infinity point of the center of the images;

FIG. 6 is an explanation drawing showing the positioning for combining images in the case where a viewpoint is set at a point on an extension of the center of the images;

FIG. 7 is an explanation drawing showing the positioning for combining images in the case where a viewpoint is shifted from the center of the images;

FIGS. 9(A)–9(C) are graphs showing relations between CT value and transparency in the case where the transparency is set as a function for combining images; and FIG. 10 is a conceptual view showing the conventional procedure for forming and combining images.

DETAILED DESCRIPTION OF THE PREFERRED EMBODIMENT

The invention will be described in further detail by way of example with reference to the accompanying drawings.

Figure 1:
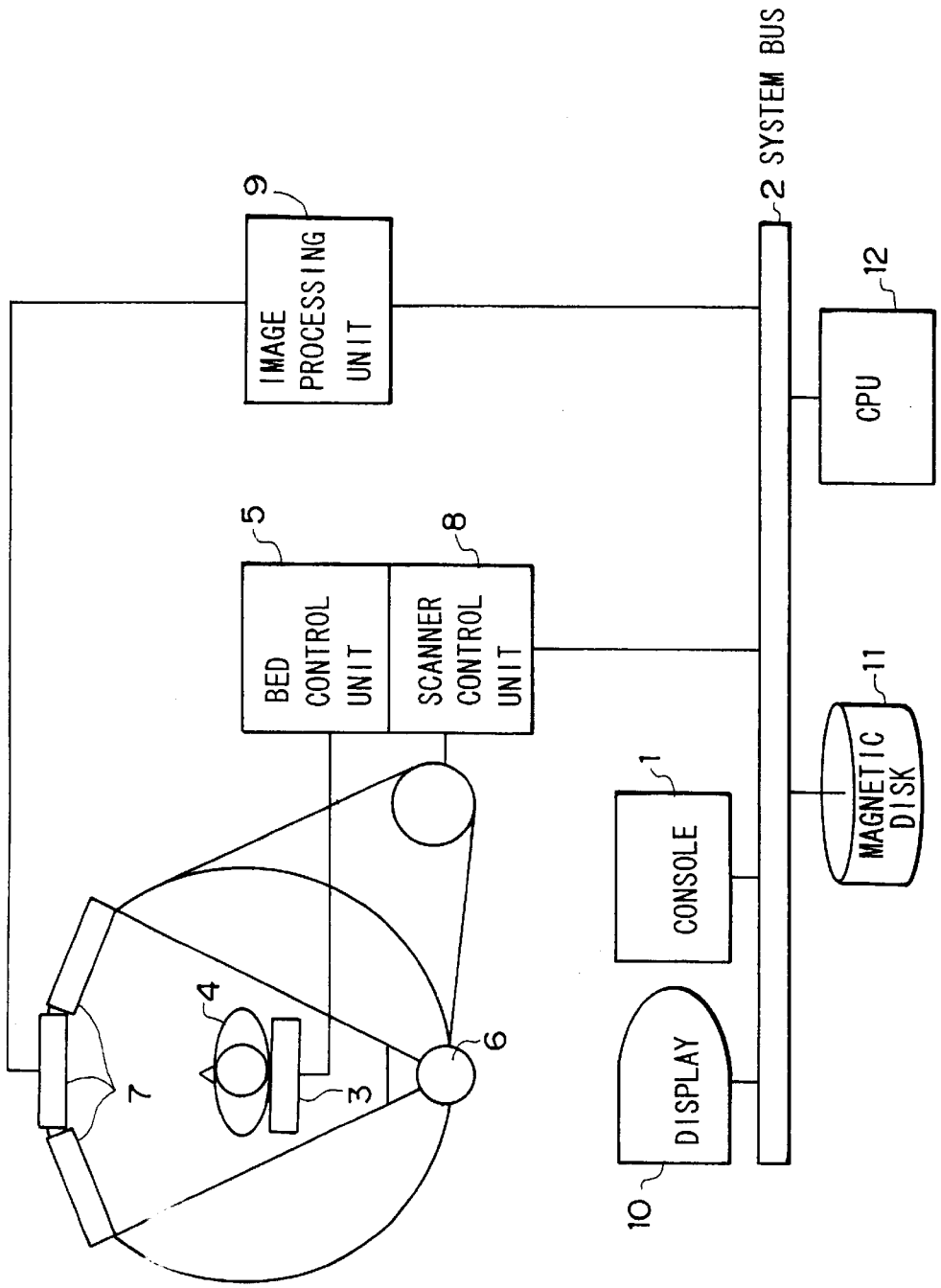
FIG. 1 is a view showing the structure of an X-ray CT system.

FIG. 1 shows the structure of an X-ray CT system according to an embodiment of the present invention. An operator such as a doctor and a radiologist designates the measurement conditions by means of a console 1, and the designated measurement conditions are transmitted to control units and the like through a system bus 2. An X-ray generator 6 applies X-rays to a subject (a patient) 4 on a bed 3, and detectors 7 measure the X-rays transmitted through the subject 4 to acquire data. The X-ray generator 6 and the detectors 7 are revolved by a scanner control unit 8 to thereby acquire measurement data at all the angles from the subject 4. The measured X-ray data are transferred to an image processing unit 9, which reconstructs an image (a tomographic image at a measured position) from the measured data. An image display unit 10 displays the reconstructed tomographic image, which is also stored in a magnetic disk 11. A CPU 12 controls the sequence of the above-operation, and a bed control unit 5 controls the bed 3.

The X-ray CT system performs the image acquisitions at a plurality of tomographic positions (measurement positions), for example, from the top to the chin of the head, on the chest, or on the abdominal region. Two-dimensional CT image data is reconstructed from the measured data. For example, the measurement positions are sequentially changed in a spiral scan form disclosed in U.S. Pat. No. 4,789,929 to thereby perform measurement and reconstruction at each position. The scan form should not necessarily be spiral, but it may take a variety of forms in the conventional X-ray CT systems.

A viewpoint is set so that the first measurement position can be at the rear and the latest measurement position can be at the front, and the two-dimensional data are combined to produce three-dimensional data (hereinafter referred to as the latest three-dimensional data) $F_n$ including the two-dimensional image at the latest measurement position by the following equation (5):

$$F_n(d_1, d_2, \ldots, d_n) = G_n\{F_{n-1}(d_1, d_2, \ldots, d_{n-1}), d_n\}, \quad (5)$$

where n (n=2, 3, . . . ) is the latest measurement position, $F_{n-1}$ is the three-dimensional data (hereinafter referred to as the second latest three-dimensional data) that is composed from the two-dimensional images from the first measurement position to the second latest measurement position (n−1) just before the latest measurement position, and $G_n$ is a combining function for combining the second latest three dimensional data $F_{n-1}$ and the latest two-dimensional data $d_n$ at the latest measurement position n. The data equivalent to the data at the second latest measurement position may be produced and used from the data at a measurement position before the second latest measurement position with the interpolation or the extrapolation.

As stated above, the two-dimensional data $d_1, d_2, \ldots, d_{n-1}$ are not used at the latest measurement position n. The latest three-dimensional data $F_n$ is produced from the second latest three-dimensional data $F_{n-1}$ composed from the two-dimensional data acquired by the second latest measurement position (n−1) and the latest two-dimensional data $d_n$. This composition is performed for every measurement to produce the three-dimensional data recursively, thus simplifying and facilitating the processing.

For example, the combining function $G_n$ is determined as described below.

(I) If a transparency is used: the transparency is determined according to the amount of data (in this case, the absorbency of the X-rays), and the latest three-dimensional data $F_n$ is produced in such a way that the rear data is not reflected if there is opaque data at the front and that the rear data is reflected if there is transparent data at the front. In this case, the combining function is represented as:

$$F_n(d_1, d_2, \ldots, d_n) = w(d_n) \cdot d_n + (1 - w(d_n)) \times F_{n-1}(d_1, d_2, \ldots, d_{n-1}) \quad (6)$$

where $w(d_n)$ is the transparency of the latest reconstructed two-dimensional data $d_n$ (0 indicates transparent, 1 indicates opaque, intermediate values indicate semitransparent).

(II) If a maximum value is used, the combining function is represented as:

$$F_n(d_1, d_2, \ldots, d_n) = \max(d_1, d_2, \ldots, d_n), \quad (7)$$

where $\max(d_1, d_2, \ldots, d_n)$ is a maximum value of the data $d_1, d_2, \ldots, d_n$. The second latest three-dimensional data is $\max(d_1, d_2, \ldots, d_{n-1})$. In the composition, the maximum value $\max(d_1, d_2, \ldots, d_{n-1})$ is compared with the latest data $d_n$, and the larger one is defined as the latest maximum value $d_{max}$.

(III) If a mean value is used, the combining function is represented as:

$$F_n(d_1, d_2, \ldots, d_n) = \text{mean}(d_1, d_2, \ldots, d_n), \quad (8)$$

where $\text{mean}(d_1, d_2, \ldots, d_n)$ is a mean value of the data $d_1, d_2, \ldots, d_n$. The second latest three-dimensional data is $\text{mean}(d_1, d_2, \ldots, d_{n-1})$. The latest mean value $\text{mean}(d_1, d_2, \ldots, d_n)$ is calculated from the second latest mean value $\text{mean}(d_1, d_2, \ldots, d_{n-1})$ and the latest data $d_n$ by the following equation:

$$\text{mean}(d_1, d_2, \ldots, d_n) = \{\text{mean}(d_1, d_2, \ldots, d_{n-1}) \times (n-1) + d_n\}/n. \quad (9)$$

(IV) If a depth projection method is used, the processing is performed in the same manner as in the prior art and the composition is performed recursively as is the cases with (I)–(III).

In (II) and (III), the combining functions are defined by the maximum value and the mean value, respectively, but the combining function may also be defined by statistical characteristic values such as a variance and a standard deviation.

Figure 2:
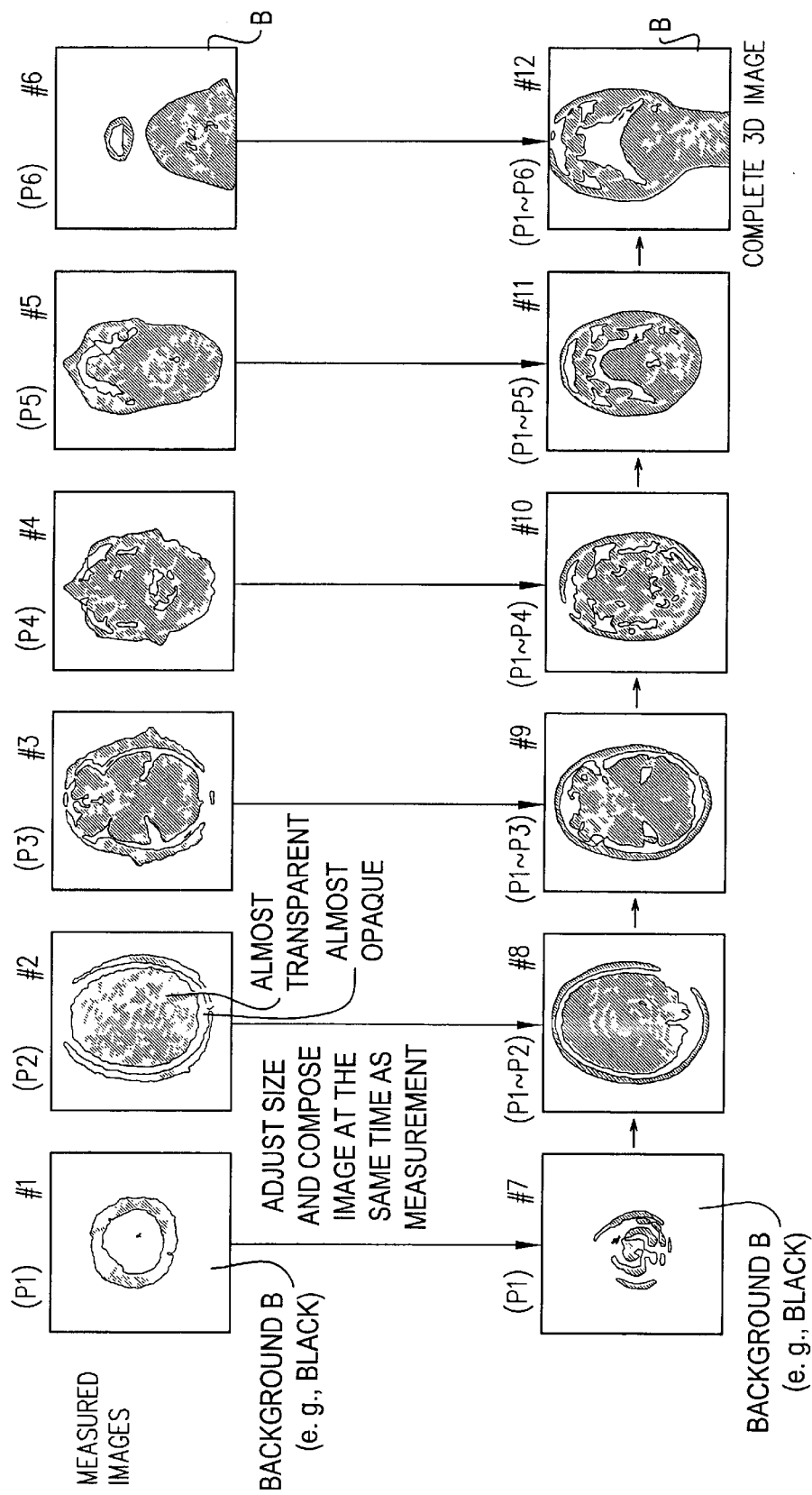
FIG. 2 is a conceptual view showing the procedure for forming and combining images of at head phantom.

FIG. 2 is a conceptual view showing the procedure for forming three-dimensional images according to the embodiment of the present invention. Images #1–#6 in FIG. 2 are two-dimensional images acquired by measuring a phantom of the human head, and images #7–#12 are three-dimensional images. In the conventional measurement in FIG. 10, only the two-dimensional images (#1–#6) are outputted every time the measurement positions are changed like $P_1$ (starting position)→$P_2$→ . . . →$P_6$. In this embodiment, an image area is provided for forming the three-dimensional images, and the two-dimensional image #1 is reconstructed to form a three-dimensional image #7 in parallel with the measurement. When the two-dimensional image #2 is acquired, the three-dimensional image #8 is formed from the three-dimensional image #7 and the two-dimensional image #2. When the two-dimensional image #3 is acquired, the three-dimensional image #9 is formed from the three-dimensional image #8 and the two-dimensional image #3. The three-dimensional images are recursively formed in this manner. The formed three-dimensional images #7, #8, . . . are sequentially shown on a display.

In this embodiment, the three-dimensional image can be formed within a short period of time since the three-dimensional image is formed immediately after the reconstruction of the two-dimensional image (it depends on the operation time required for composing one image). The conventional method, however, has such an advantage that the composition angle (viewpoint) and the calculation for composition may be determined more freely than in the present invention. It is therefore preferable to use the present invention and the conventional method appropriately.

Figure 3:
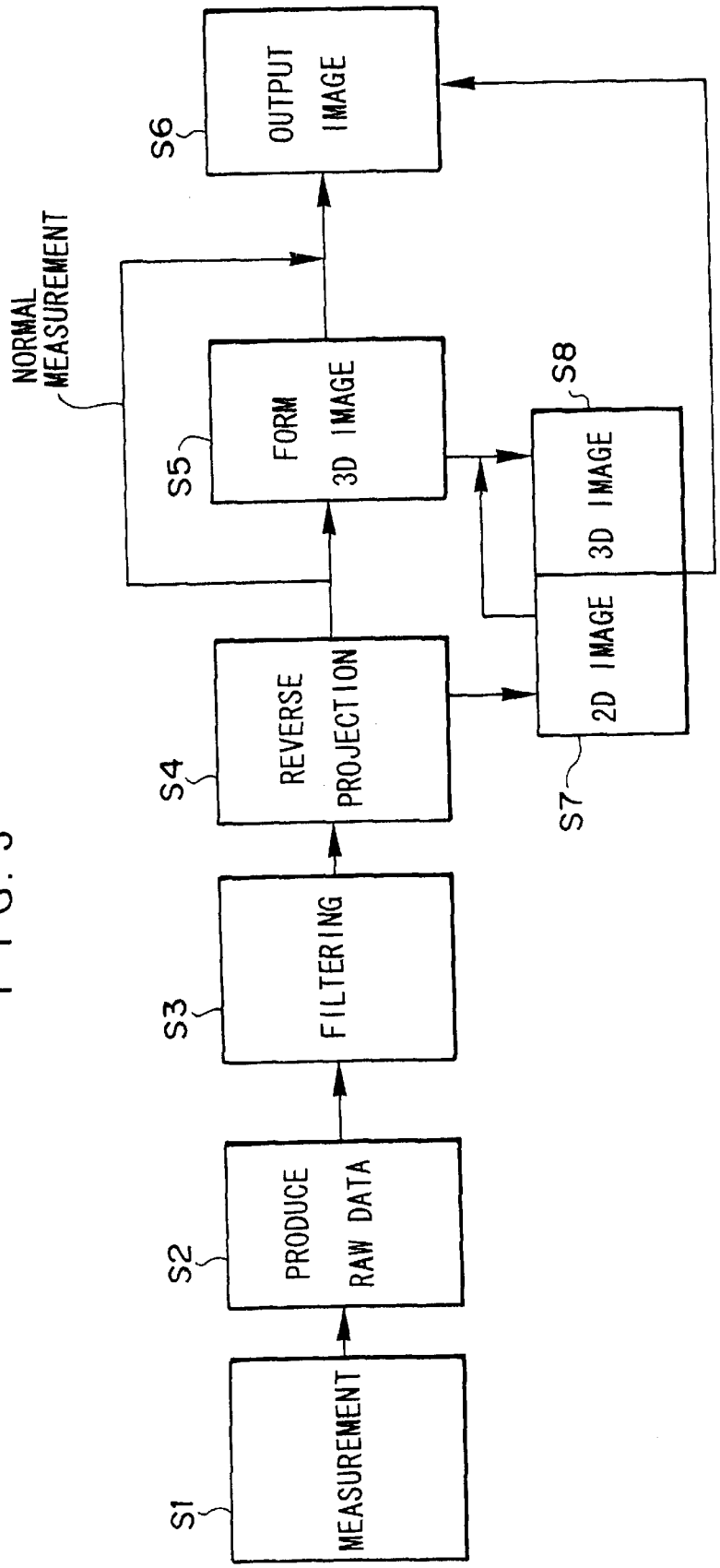
FIG. 3 is a flow chart showing the flow of an image processing arithmetic.

FIG. 3 is a flow chart showing the flow of image processing performed by the image processing unit 9.

First, the detectors 7 measure the quantity of X-rays, which is of a two-dimensional data group relating to opening directions and a measurement angle of the detectors 7 (S1). Then, raw data is obtained from the measured quantity of X-rays. The raw data is projection data obtained by converting the measured quantity of X-rays to values relating to the mass of the measured part of the subject. The measured quantity of X-rays is converted with a logarithmic function since the measured quantity of X-rays is exponentially decreased as the mass of the measured part is increased. The obtained raw is also two-dimensional data relating to the opening directions and the measurement angle of the detectors 7. Next, the raw data is filtered (S3) and is reversely projected to form a tomographic image (S4). In this process, the value of the projection data is reflected at all points on a straight line and are added. If the raw data is reversely projected as it is, the values become higher at the center of the subject, and this results in the formation of an incorrect image (the incorrect distribution of the X-ray absorbency). To solve this problem, the raw data is filtered at S3. The filtering is performed on the basis of one-dimensional data in the X-ray radiation direction. More specifically, the one-dimensional data is created by picking up the data in the same direction from the raw data, and the one-dimensional filtering results are outputted the same number of times as the number of measuring angles.

In the reverse projection, a two-dimensional image is formed by projecting the filtered results on the image and adding up them for every angle. The image is two-dimensional data along the lateral and longitudinal directions (the lateral and sagittal directions of the subject).

The image is outputted in the normal measurement (in which no three-dimensional image is formed) (S7 and S6). When a three-dimensional image is formed, the three-dimensional image is formed (S5) before the output. The image may be outputted as either the normal two-dimensional image or the three-dimensional image (S7, S8 and S6).

FIGS. 4(A)–4(F) are explanation drawings showing output data at the steps S1–S4 in FIG. 3, respectively. FIG. 4(A) shows the output data relating to one angle of the detectors 7. Data indicated by a dotted line in FIG. 4(A) that is measured previously in the state wherein there is no presence of a subject (i.e., the data acquired in the measurement of the air), is decreased by the subject as indicated by a solid line (the decreased part varies according to the shape of the subject). FIG. 4(B) shows the raw data relating to one angle. If the air is measured, all the raw data is almost 0. The raw data is formed according to the size and shape of the subject. FIG. 4(C) shows the filtered result, which is shaped in such a manner as to enhance a difference between the adjacent data in the simple projection data. FIG. 4(D) shows the result obtained by developing the filtered results two-dimensionally and adding up the filtered results relating to all angles (the reverse projection). As a result of the reverse projection, two-dimensional data (image) is formed as shown in FIG. 4(E).

The actual outputted image is acquired by using so-called CT values, which are obtained by adjusting the reverse reflection result so that the air can be −1000 and a part with the same X-ray absorbency as the water can be 0.

As stated previously, the latest three-dimensional data $F_n$ is obtained from the second latest three-dimensional data $F_{n-1}$ and the latest two-dimensional data $d_n$:

$$F_n = G_n(F_{n-1}, d_n). \quad (10)$$

Normally, the viewpoint is set so that the first measurement position can be at the rear and the latest measurement position can be at the front. Thus, all the images are viewed from the same position. Therefore, $F_{n-1}$ and $d_n$ that have the same coordinates (x, y) but differs in z are combined. More specifically, the composition is performed for an arbitrary point (x, y) according to the following equation:

$$F_n(x, y) = G_n\{F_{n-1}(x, y), d_n(x, y)\}. \quad (11)$$

In this case, a viewpoint E is set at an infinity point, seen from the subject M, on a line extended from the center of each image along the axis of the subject (the z-axis). FIG. 5 is an explanation drawing therefor. In FIG. 5, z is the axis along the axis of the subject, and the coordinate axes x and y of the two-dimensional plane perpendicular to the z-axis are set as shown in FIG. 4(E).

As shown in FIG. 6, if the viewpoint E is not set at the infinity point but in proximity to the subject M, the rear image and the front image are overlapping in such a manner that the rear image is positioned at the inside of the front image. In this case, $F_{n-1}$ is reduced and then combined with $d_n$, for example, according to the following equation:

$$F_n(x, y) = G_n\{F_{n-1}(K \cdot x, K \cdot y), d_n(x, y)\}, \quad (12)$$

where K is a reduction rate and more than 1. The reduction rate K depends on the distance between the subject M and the viewpoint E, and on the shift ($P_i - P_{i-1}$) of the measurement position per measurement. If, however, the reduction rate K is fixed regardless of the measurement points on the assumption that the shift ($P_i - P_{1-1}$) of the measurement position is constant, the point of the latest image and the points of the third latest image and older images do not correspond. The closer the viewpoint is, the larger the difference is. To address this problem, the reduction rate can be changed for every measurement as follows:

$$F_n(x, y) = G_n\{F_{n-1}(K_n \cdot x, K_n \cdot y), d_n(x, y)\}, \quad (13)$$

where $K_n$ is changed according to n.

The viewpoint may be shifted from the center of the image. FIG. 7 shows an example in which the viewpoint E is set on the extension of the top end of the image. This can change the composition angle from the axial direction. The center of the image is adjusted vertically in contrast to FIGS. 5 and 6, in which the center of the image (x, y)=(0, 0) is constant. Since each image is viewed diagonally, the image must be deformed (in this case, from a square into a trapezoid). The deformation, reduction, etc. of the image is represented by the following coordinate transformation:

$$(x, y) \rightarrow (a_1 \cdot x + b_1 \cdot y + c_1, a_2 \cdot x + b_2 \cdot y + c_2) \quad (14)$$

Consequently, the images are combined according to the following equation:

$$F_n(x, y) = G_n\{F_{n-1}(a_1 \cdot x + b_1 \cdot y + c_1, a_2 \cdot x + b_2 \cdot y + c_2), d_n(a_3 \cdot x + b_3 \cdot y + c_3, a_4 \cdot x + b_4 \cdot y + c_4)\}. \quad (15)$$

Figure 8:
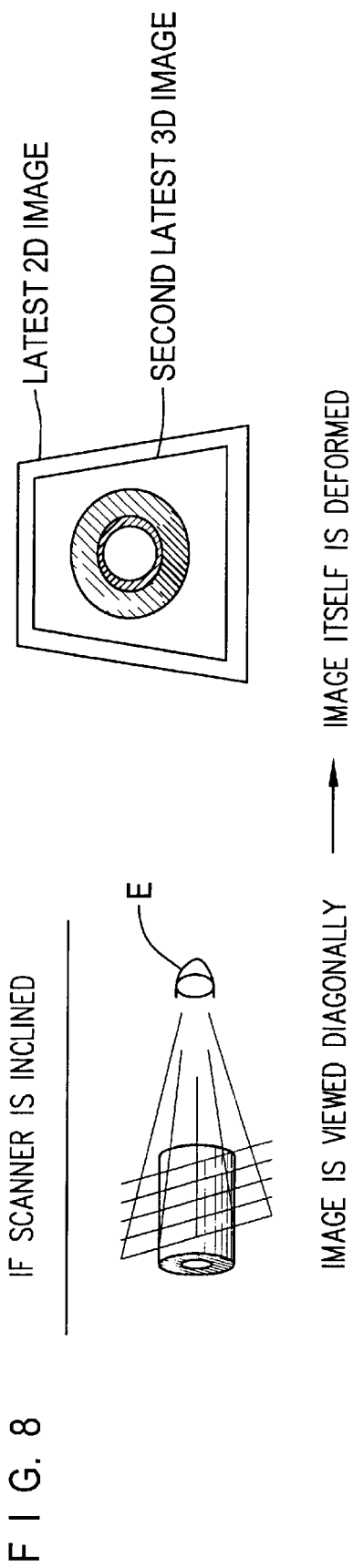
FIG. 8 is an explanation drawing showing the positioning for combining images in the case where a scanner is inclined.

As shown in FIG. 8, the scanner of the X-ray CT system is sometimes inclined without setting the measurement plane perpendicular to the axis of the subject (i.e., a direction in which the bed moves). In this case, the images are deformed and reduced in the composition in accordance with the inclination of the viewpoint and the distance between the viewpoint and the images as shown in FIG. 7.

The X-ray CT system may form a three-dimensional image of an arbitrary composition angle. If, however, the images are seen from just beside, the data reflecting each of the images is only represented by a line. Hence, in the above description, the viewpoint is restricted to an angle at which the image is normally viewed. The reason why the latest image is arranged in front of the second latest image is that the outputted images hardly change between the measurements if the latest image would be arranged behind the second latest image.

In the image composition calculation, the transparency is usually used as shown in the equation (6). In FIG. 2, the transparency is set by the CT value as shown in FIG. 9(A). Usually, the soft tissues of a human body have almost the same X-ray absorbency as the water (i.e. in proximity to CT value 0). The blood vessels in the angiography and the bones have CT values of several hundreds or higher. Therefore, if the transparency is set so that the soft tissues are transparent and the bones are opaque, it is possible to form a three-dimensional image that three-dimensionally shows the bones. If a certain range of the CT values is paid attention to, the functions in FIGS. 9(B) and 9(C) may be used.

There is no data subject of combination in the first measurement, but there is no problem if the area subject of the data composition is initialized by the transparent data (e.g., $F_0(x, y) = 0$ with respect to an arbitrary coordinate (x, y)). In FIG. 2, a background image B is an initialized image. The background image is, for example, in black. In FIG. 2, however, the background image B is in white since the image in black would be unclear.

The transparent data may be buried in a part other than the range of the data generated by the reduction and deformation of the images.

The present invention includes a three-dimensional image processing method as described below. First, a plurality of measurement positions is set in a predetermined order in a predetermined direction of a subject. Then, measurement data of the subject is collected at the plurality of measurement positions. Next, two-dimensional image data is acquired from the measurement data at the plurality of measurement positions in the predetermined order. Every time the latest two-dimensional image data is acquired, three-dimensional image data is produced on the basis of the latest two-dimensional image data and two-dimensional image data acquired before the latest two-dimensional image data. Finally, the three-dimensional image data is displayed as a three-dimensional image every time the three-dimensional image data is produced.

The present invention also includes a three-dimensional image processing method as described below. First, a plurality of measurement positions is set in a predetermined order in a predetermined direction of a subject. Then, measurement data is collected at the plurality of measurement positions. Next, two-dimensional image data is acquired from the measurement data at the plurality of measurement positions. Thereafter, three-dimensional image data is produced on the basis of the two-dimensional image data acquired before the finally-set measurement position among the plurality of measurement positions while the measurement data are collected and acquiring two-dimensional image data at the finally-set measurement position among the plurality of measurement positions. Finally, three-dimensional image data is produced in a measurement area corresponding to the plurality of measurement positions by combining the three-dimensional image data and the two-dimensional image data acquired at the finally-set measurement position.

It is difficult to compare the time required from the start to completion of the measurement between the prior art and the present invention (the time from the start to completion of the measurement depends on a combining function for forming a three-dimensional image). However, the time required for the conventional three-dimensional image processing is divided by the measurement times according to the present invention. Thus, even if the entire processing time of the prior art and the present invention is equal, the waiting period is shorter according to the present invention.

Moreover, the three-dimensional image formed by one processing in the prior art is only one image of the entire measurement data that is seen from outside. The present invention significantly increases the amount of information that may be used for the diagnosis, by forming the three-dimensional images in the same number as the measurement times.

Furthermore, since the image reconstruction and composition are performed at the same time as the measurement, the currently-measured position can be confirmed with a three-dimensional image.

The measurement positions are updated along the axis in the above-described embodiment, but they may also be updated in other directions.

The measurement reconstruction CT image data is the two-dimensional image data in this embodiment, but the measurement reconstruction CT image data may also include interpolation CT image data, which is obtained by interpolation from the measurement reconstruction CT image data. If the reconstruction pitch is rough, the interpolation CT image data is calculated at the intermediate positions. The calculated interpolation CT images are also used to update the three-dimensional images.

In the above-described embodiment, the three-dimensional image is formed at the same time as the measurement of the CT image, but it is also possible to form the three-dimensional image after the acquisition of the CT image.

In the above-described embodiment, the X-ray CT system acquires the image data, but the present invention may also be applied to any apparatus that is capable of acquiring tomographic images of a subject, such as other CT systems, magnetic resonance imaging systems and ultrasonographic systems.

According to the present invention, the latest three-dimensional image data at the latest measurement position is composed from the second latest three-dimensional image data and the two-dimensional image data at the latest measurement position. This enables the real-time display of the three-dimensional image data during the acquisition of the two-dimensional data.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A three-dimensional image processing apparatus, comprising:

a measurement position setting device which sets a plurality of measurement positions in a predetermined order in a predetermined direction of a subject;

a measurement data collecting device which collects measurement data of said subject at the plurality of measurement positions;

a two-dimensional image data acquiring device which acquires two-dimensional image data from said measurement data at the plurality of measurement positions in the predetermined order;

a three-dimensional image data producing device which produces, every time the two-dimensional image data acquiring device acquires latest two-dimensional image data, three-dimensional image data on the basis of the latest two-dimensional image data and two-dimensional image data acquired before the latest two-dimensional image data; and a display which displays the three-dimensional image data as a three-dimensional image every time the three-dimensional image data producing device produces the three-dimensional image data.

2. A three-dimensional image processing apparatus, comprising:

a measurement position setting device which sets a plurality of measurement positions in a predetermined order in a predetermined direction of a subject;

a measurement data collecting device which collects measurement data of said subject at the plurality of measurement positions;

a two-dimensional image data acquiring device which acquires two-dimensional image data from said measurement data at the plurality of measurement positions; and a three-dimensional image data producing device which produces three-dimensional image data on the basis of the two-dimensional image data at the plurality of measurement positions, the three-dimensional image data producing device producing three-dimensional image data in a measurement area corresponding to the plurality of measurement positions set by said measurement position setting device by combining three-dimensional image data produced on the basis of two-dimensional image data at a measurement position that is set before the finally-set measurement position among the plurality of measurement positions and two-dimensional image data at the finally-set measurement position while said measurement data collecting device is measuring the measurement data.

3. The three-dimensional image processing apparatus as defined in claim 2, further comprising a display which displays the three-dimensional imaga data, produced by the three-dimensional image data producing device, as a three-dimensional image.

4. The three-dimensional image processing apparatus as defined in claim 2, wherein the three-dimensional image data producing device produces the three-dimensional image data by using transparency applied to the two-dimensional image data.

5. The three-dimensional image processing apparatus as defined in claim 2, wherein the three-dimensional image data producing device comprises means for acquiring statistical characteristic values of the two-dimensional image data acquired at the plurality of measurement positions and means for producing the three-dimensional image data by using the acquired statistical characteristic values for transparency.

6. The three-dimensional image processing apparatus as defined in claim 2, wherein the three-dimensional image data producing device produces the three-dimensional image data in a depth projection method.

7. A three-dimensional image processing method, comprising the steps of:

setting a plurality of measurement positions in a predetermined order in a predetermined direction of a subject;

collecting measurement data of said subject at the plurality of measurement positions;

acquiring two-dimensional image data from said measurement data at the plurality of measurement positions in the predetermined order;

producing, every time latest two-dimensional image data is acquired at the two-dimensional image data acquiring step, three-dimensional image data on the basis of the latest two-dimensional image data and two-dimensional image data acquired before the latest two-dimensional image data; and displaying the three-dimensional image data as a three-dimensional image every time the three-dimensional image data is produced at the three-dimensional image data producing step.

8. A three-dimensional image processing method, comprising the steps of:

setting a plurality of measurement positions in a predetermined order in a predetermined direction of a subject;

collecting measurement data at the plurality of measurement positions;

acquiring two-dimensional image data from said measurement data at the plurality of measurement positions;

producing three-dimensional image data on the basis of the two-dimensional image data acquired before the finally-set measurement position among said plurality of measurement positions while said measurement data are collected and acquiring two-dimensional image data at the finally-set measurement position among the plurality of measurement positions; and producing three-dimensional image data in a measurement area corresponding to the plurality of measurement positions by combining the three-dimensional image data and the two-dimensional image data acquired at the finally-set measurement position.

* * * * *